United States Patent
Turek

[15] 3,705,534
[45] Dec. 12, 1972

[54] FLUIDIC FLOW SENSING METHOD AND APPARATUS

[72] Inventor: Robert F. Turek, Silver Spring, Md.

[73] Assignee: Bowles Fluidics Corporation, Silver Spring, Md.

[22] Filed: May 12, 1970

[21] Appl. No.: 36,627

Related U.S. Application Data

[63] Continuation-in-part of Ser. No. 817,717, April 21, 1969, abandoned.

[52] U.S. Cl. ................ 73/189, 73/194 R, 137/81.5
[51] Int. Cl. ............................................. G01f 1/00
[58] Field of Search ........ 73/189, 212, 194 R, 194 M; 137/81.5

[56] References Cited

UNITED STATES PATENTS

| | | | |
|---|---|---|---|
| 3,502,092 | 3/1970 | Metzger | 137/81.5 |
| 3,605,778 | 9/1971 | Metzger | 137/81.5 |
| 2,057,645 | 10/1936 | Hamilton | 73/212 |
| 2,706,409 | 4/1955 | Preston | 73/212 |
| 3,285,263 | 11/1966 | Bjornsen et al | 137/81.5 |
| 3,429,323 | 2/1969 | Mott | 137/81.5 |
| 3,503,410 | 3/1970 | Richards | 137/81.5 |
| 3,343,413 | 9/1967 | South et al | 73/189 X |

Primary Examiner—Jerry W. Myracle
Attorney—Rose and Edell

[57] ABSTRACT

Fluidic flow sensing techniques are disclosed which permit sensitive flow measurements over a wider range of flow rates than was heretofore possible. In one embodiment a jet of working fluid, directed parallel to the sensed flow, is modulated by viscous interaction with the sensed flow, thereby changing the downstream dynamic pressure of the jet as a function of the sensed flow. In a second embodiment a jet of working fluid is directed angularly with respect to the sensed flow, producing jet deflection which is monitored as a differential pressure across a pair of downstream receivers. A negative feedback circuit, including a high gain amplifier fed by the differential pressure, controls the jet supply pressure to maintain a differential pressure null across the receivers, thereby rendering the jet supply pressure a function of the sensed flow.

38 Claims, 15 Drawing Figures

INVENTOR
ROBERT F. TUREK

BY Hurvitz, Rose + Greene

ATTORNEYS

INVENTOR
ROBERT F. TUREK

BY Hurvitz, Rose & Greene

ATTORNEYS

INVENTOR
ROBERT F. TUREK

BY *Hurvitz & Rose*

ATTORNEYS

FLUIDIC FLOW SENSING METHOD AND APPARATUS

CROSS REFERENCE TO RELATED APPLICATIONS

This application is a continuation-in-part of my co-pending U.S. Pat. application Ser. No. 817,717, filed Apr. 21, 1969, now abandoned.

BACKGROUND OF THE INVENTION

The present invention relates to measurement of fluid flow and more particularly to fluidic techniques for accurately measuring fluid flow over a wide range of flow velocity and mass flow rates. The description of the various embodiments disclosed herein is primarily oriented to the measurement of wind speed; however, it will be readily understood that the present invention is equally applicable to the measurement of flow velocity and mass flow rate for any type of fluid.

Instruments that measure fluid flow can be classified according to whether they make use of pressure, kinetic energy, cooling power, or some other physical characteristic of the flowing fluid. For example, rotation type anemometers are a class of devices which utilize the kinetic energy of the flowing fluid or wind to spin a wheel. In these types of devices rotating frictional resistance can introduce serious errors in wind velocity measurement, particularly at low wind velocities. In addition, rotation type anemometers must be carefully designed so as to minimize their moments of inertia. In the cup anemometer, for example, a cup rotates on a vertical shaft, the rotation of the cups being a non-linear function of wind velocity. In this type device, gusty wind conditions lead to erroneous measurements; this is true because the cup wheel accelerates more rapidly than it loses speed, thereby registering too high a mean wind velocity.

The pressure plate anemometer also operates on the kinetic energy of the wind and consists of a flat plate upon which the wind exerts a pressure. The plate is displaced from a reference position by the wind and balances the wind pressure against a calibrated spring. At low wind velocities, for example, on the order of 20 feet per minute, the force acting on the plate is approximately four orders of magnitude smaller than the force acting on the plate in response to wind velocities on the order of 60 miles per hour. This wide range of forces precludes accurate spring calibration in this type of instrument.

The bridled anemometer is similar to the rotation anemometer but in this case the anemometer is prevented from turning and the torque necessary to prevent turning is employed as a measure of the wind velocity. Here too the measuring forces extend over a range of approximately four orders of magnitude thereby precluding accurate calibration of the device over a sizeable range of fluid flow or wind velocities.

A pitot tube is frequently used for the measurement of relative fluid flow velocity. The kinetic energy of the fluid is converted to stagnation pressure by a tube which faces upstream of the fluid flow. However, the employment of such a device for the range of fluid velocities considered herein is not feasible. For example, the increase in pressure over ambient for flow rates on the order of 20 feet per minute is approximately $10^{-6}$ psi, a figure well below the threshold of practical pressure measuring instrumentation.

Another disadvantage inherent in the above-described kinetic energy-responsive flow measuring devices, and one which is related to poor sensitivity at low flow rates, is the non-linearity of output pressure as a function of flow velocity. More specifically, the dynamic pressure of a flowing fluid varies as a square law function of the flow velocity. Consequently, if a large range of flow velocities is to be monitored, for example a range extending over two orders of magnitude, a dynamic pressure range extending over four orders of magnitude must be measured. This of course renders accurate calibration over the monitored flow velocity range extremely difficult, if not impossible, for most purposes. Moreover, it is the square law function which is responsible for the poor sensitivity described above because of the very small slope or first derivative of this function near zero flow velocity.

There are several types of flow velocity measuring devices which make use of the cooling power of the flowing fluid. The most popular of these is probably the hot wire anemometer. However, it has been found that this instrument does not function well in the rain or other wet environments. Further, the heat transferred from the hot wire induces convective fluid currents which place a lower limit on sensible fluid velocities.

Electronics offers some interesting techniques for measuring fluid flow velocity. For example, ultrasonic pulse, ultrasonic transient time, and ultrasonic doppler techniques all employ high speed electronic circuits to interrogate acoustic signals which are used to measure flow velocity. However, these systems require relatively sophisticated and complex equipment, and in addition are relatively expensive.

Fluidic technology is, in part, based on the concept that by interacting one fluid stream with another amplification of pressure and flow signals can be achieved without moving parts. The application of fluidics to flow sensing is a natural extension of the fluidic amplification approach. A prior art endeavor to employ fluidics for flow velocity measuring purposes can be found in the U. S. Pat. No. 3,343,413 to South et al. In the South et al. patent, the flow being monitored is directed transversely of a jet of working fluid, deflecting the jet relative to a pair of receivers as a function of the flow velocity. The jet deflection is then measured as a differential pressure appearing across the receivers. This approach permits measurement of very low fluid velocities with greater accuracy than is achievable with the above-described flow sensing techniques. However, the range of flow velocities over which this approach is operable is severely limited. More particularly, if this approach is employed to monitor very low flow velocities, significantly higher flow velocities tend to deflect the power jet out of range of the receivers. If the approach is designed to monitor high flow velocities, low flow velocities effect insignificant deflection of the power jet. Consequently the South et al technique can be employed only for a limited range of fluid flow velocities.

It is therefore an object of the present invention to provide a fluidic technique for flow velocity and mass flow rate measurement which is accurate over a relatively wide range of velocities and rates.

It is another object of the present invention to provide a fluidic flow measuring apparatus capable of sensitively monitoring small flow velocity and flow rate variations at low flow velocities and rates.

It is another object of the present invention to provide a fluidic flow sensor in which a linearity of response to flow variations is achieved more simply and efficiently then in prior art flow sensors.

It is another object of the present invention to provide an improvement over the fluid flow measuring device described in U. S. Pat. No. 3,343,413 so that such a device can be employed to sense fluid flow over a significantly wider flow range.

SUMMARY OF THE INVENTION

In accordance with one aspect of the present invention a nozzle is arranged to direct a jet of air toward a receiver tube. If the surrounding fluid has a flow field with a velocity or flow rate parallel to the jet direction, the velocity of the jet at the receiver (and hence the pressure sensed at the receiver) increases or decreases as a function of the surrounding fluid flow. The effect of this is to shift the quiescent velocity at the receiver tube from zero flow velocity to a higher flow velocity. For a given change in the surrounding flow rate or velocity, the dynamic pressure sensed at the receiver experiences a much larger change when referenced to the higher quiescent point than when referenced to zero velocity. Consequently this approach permits much more sensitive flow velocity measurements at low flow velocities than does a pitot probe, for example, which is extremely insensitive to low flow velocities varying about a zero flow velocity quiescent point.

An extension of the above described approach to flow velocity measurement employs two jets of air flowing parallel to the measured flow but in opposite directions to one another. This is analogous to a bridge type of circuit offering the advantage of a differential pressure output signal having a zero or null point which is insensitive to variations in the jet supply pressure. In addition, the two unit configurations, by providing a differential pressure output signal, has a substantially linear pressure versus velocity characteristic due to the fact that the non-linearities in each unit exactly balance one another.

In another aspect of the present invention the cross flow sensing configuration described in U. S. Pat. No. 3,343,413 is improved by including a negative feedback circuit for varying the supply pressure as a function of the monitored flow velocity. More particularly, a power jet is issued from a nozzle disposed asymetrically relative to a pair of receivers. The power jet is directed perpendicular to the monitored flow so that changes in the flow velocity tend to change the deflection of the jet and produce changes in the differential pressure appearing across the receivers. This differential pressure is applied as an input signal to a high gain amplifier in a negative feedback loop which controls the power jet pressure. Changes in flow velocity therefore produce concomitant changes in the supply pressure necessary to maintain a constant differential pressure across the receivers. The supply pressure is therefore a measure of the flow velocity. This supply pressure feedback approach is also applied to the parallel flow sensor.

A further approach to fluidic flow sensing employs a combination of the parallel and cross flow techniques. In this approach a pair of power jets are issued in opposite directions, parallel to the measured flow, and in axially impacting relationship. The effect of this configuration is to render the power jets equivalent to an impact modulator of the type generally described in U. S. Pat. No. 3,279,489, wherein a resultant stream is radially directed from the impact point in a direction determined by the momenta of the impacting streams. The measured flow in this approach affects the opposed power jets individually in opposite senses as described above in relation to the parallel flow sensor, thereby shifting the impact point as a function of flow velocity. In addition, the resultant stream emanating from the impact point is deflected by the measured flow as a function of flow velocity. The measured flow velocity can thus be sensed as a function of the orientation of the resultant stream.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DETAILED DESCRIPTION OF PREFERRED EMBODIMENTS

Figure 1:
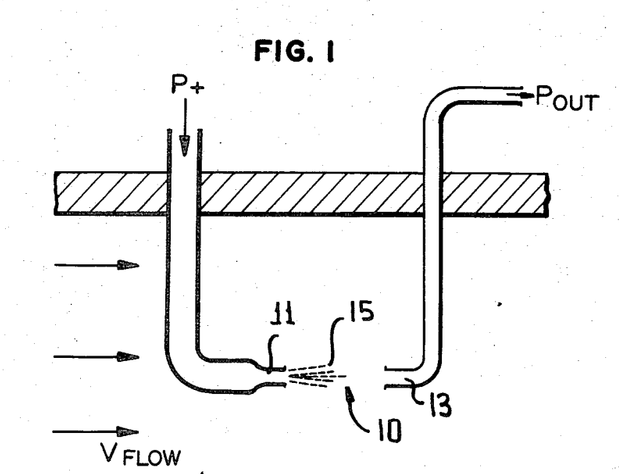
FIG. 1 is a diagrammatic illustration of a parallel flow type fluidic flow sensor of the present invention.

Referring now specifically to FIG. 1 of the accompanying drawings, there is illustrated a fluidic parallel flow sensor 10 comprising a power nozzle 11 and a receiver tube 13 disposed downstream of the power nozzle. A source of pressurized fluid, P+, is supplied to power nozzle 11 which responds by issuing a power jet 15 of that fluid generally toward receiver tube 13. In the embodiment illustrated in FIG. 1 receiver tube 13 is oriented coaxially with power nozzle 11 and has a receiving aperture which is somewhat smaller than the cross section of power nozzle 11. These specific relative sizes and orientations of the receiver tube aperture and the power nozzle are by no means limiting; this feature is discussed in greater detail below.

Power jet 15 is issued in a direction parallel to the component of ambient fluid flow velocity or mass flow rate ($V_{flow}$) to be measured. This ambient fluid may, for example, be ambient air in which case sensor 10 operates as a wind velocity sensor. The power jet fluid in this instance may also be air. The velocity of jet 15 at receiver 13 is a function of $V_{flow}$. More specifically, in still air ($V_{flow} = 0$) the velocity of the jet when received by receiver tube 13 is at some predetermined velocity, referred to herein as the quiescent velocity. When the ambient air or wind flows in the same direction as jet 15 the velocity of at least a portion of the jet received by receiver tube 13 increases, and when the ambient air flows in a direction opposite to that of jet 15 the velocity of that portion of the jet received by tube 13 decreases. This fact may be more readily appreciated in view of the following description referring to FIG. 1a.

Figure 1A:
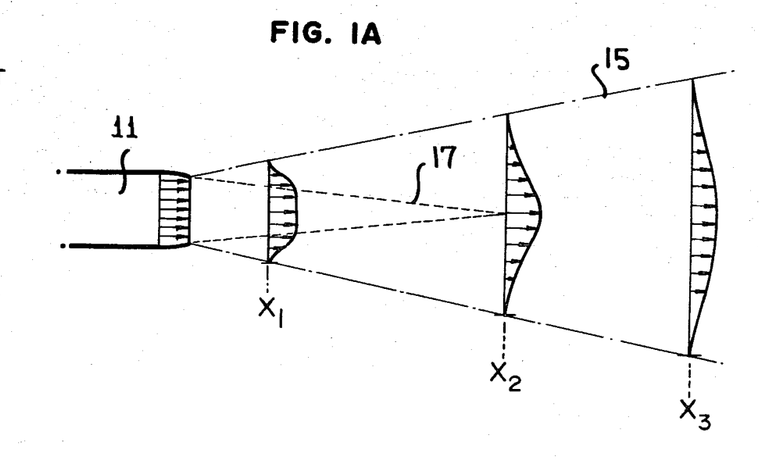
FIG. 1a is a diagrammatic illustration of the velocity profile of a fluid jet at different downstream locations.

In FIG. 1a the velocity profile of jet 15 issuing from nozzle 11 is diagrammatically illustrated at four different locations, namely at the egress orifice of nozzle 11, and at respective locations $X_1$, $X_2$ and $X_3$ which are successively downstream of nozzle 11. A central core 17 of generally conical configuration extends approximately six power nozzle widths downstream from nozzle 11, the pressure and velocity in the core remaining essentially unchanged from the pressure and velocity across the entire stream at the egress orifice of nozzle 11. In other words, at the egress orifice of nozzle 11 the entire stream 15 is within core 17 and the velocity gradient is constant across the entire width of the jet. Downstream of nozzle 11 the velocity gradient of the power stream is constant only within core 17; outside the core the velocity gradient decreases, rapidly at first and then with decreasing slope, as the distance from the core increases. At location $X_1$ therefore a relatively large cross-section of the jet is at maximum velocity. At location $X_2$, which is approximately at the termination of core 17, the constant velocity portion of the velocity profile encompasses such a relatively small transverse section of the power stream as to approximate a point from which the velocity gradient begins decreasing with decreasing slope. The familiar bell-shaped velocity profile is in evidence here. Beyond $X_2$, for example at $X_3$, no portion of jet 15 flows at the discharge velocity of jet 15, and the velocity profile, though bell configured, has a smaller maximum velocity.

The reason for the variation in the velocity profile configuration as a function of downstream location from the power nozzle is the viscous shear effect produced by the ambient air surrounding jet 15. This viscous shear causes the jet to spread, narrowing the maximum velocity core 17, and slowing down the jet. If receiver tube 13 of FIG. 1 is located within core 17, ambient air flow ($V_{flow}$) has little or no effect on the air pressure sensed by the receiver tube. This is because the ambient air simply does not significantly affect core 17. It is therefore desirable, and in fact necessary, that the ingress orifice of receiver tube 13 be located so as not to receive core 17 of jet 15. This requirement can be accommodated either by placing the ingress orifice of receiver tube 13 downstream of location $X_2$, or alternatively, by axially misaligning the ingress orifice of receiver tube 13 with respect to power nozzle 11 so that the portion of jet 15 received by receiver tube 13 does not include core 17. The important consideration here is that the pressure in core 17 is primarily a function of the jet supply pressure, P+, and not the velocity of the ambient fluid.

The sensed pressure in a tube facing upstream in a stream of air is a square law function of the velocity of the received air. This function is illustrated as curve A of FIG. 5. Curve A, being a square law function, indicates a very small pressure change, namely 0.063 psig, in response to a flow velocity change from 0 to 60 mph. This points up the sensitivity problem involved in utilizing pitot tube pressure sensors to measure flow velocities on the order of 20 feet per minute or 0.227 mph; more specifically, at the low end of the velocity range of curve A, a 0.227 mph variation in flow velocity produces a variation of $10^{-6}$ psi in dynamic pressure (imperceptible on curve A). Rather elaborate instrumentation is required for detecting such low pressure variations. However, sensor 10 of FIG. 1 effectively shifts the quiescent operating point Q from zero velocity and zero dynamic pressure to the velocity of jet fluid received by tube 13 in still air (i.e. — when $V_{flow}$ is zero), thereby referencing $V_{flow}$ to point Q rather than point (0,0). In a specific example illustrated in curve A in FIG. 5 quiescent point Q is chosen at 220 mph. That is to say, the velocity of the portion of the air power jet ($V_{jet}$) received by receiver tube 13 in the absence of any ambient flow in the air surrounding jet 15 is 220 mph. For this quiescent point Q, a 60 mph variation in flow velocity about point Q produces a much larger pressure variation than is produced by a 60 mph wind velocity change about the zero velocity point of curve A. More important, however, is the fact that very small variations in $V_{flow}$ about point Q produce readily measurable variations in $P_{out}$ and permit the use of a single sensor to accurately measure $V_{flow}$ variations from approximately a few feet per minute to 60 mph.

Figure 5:
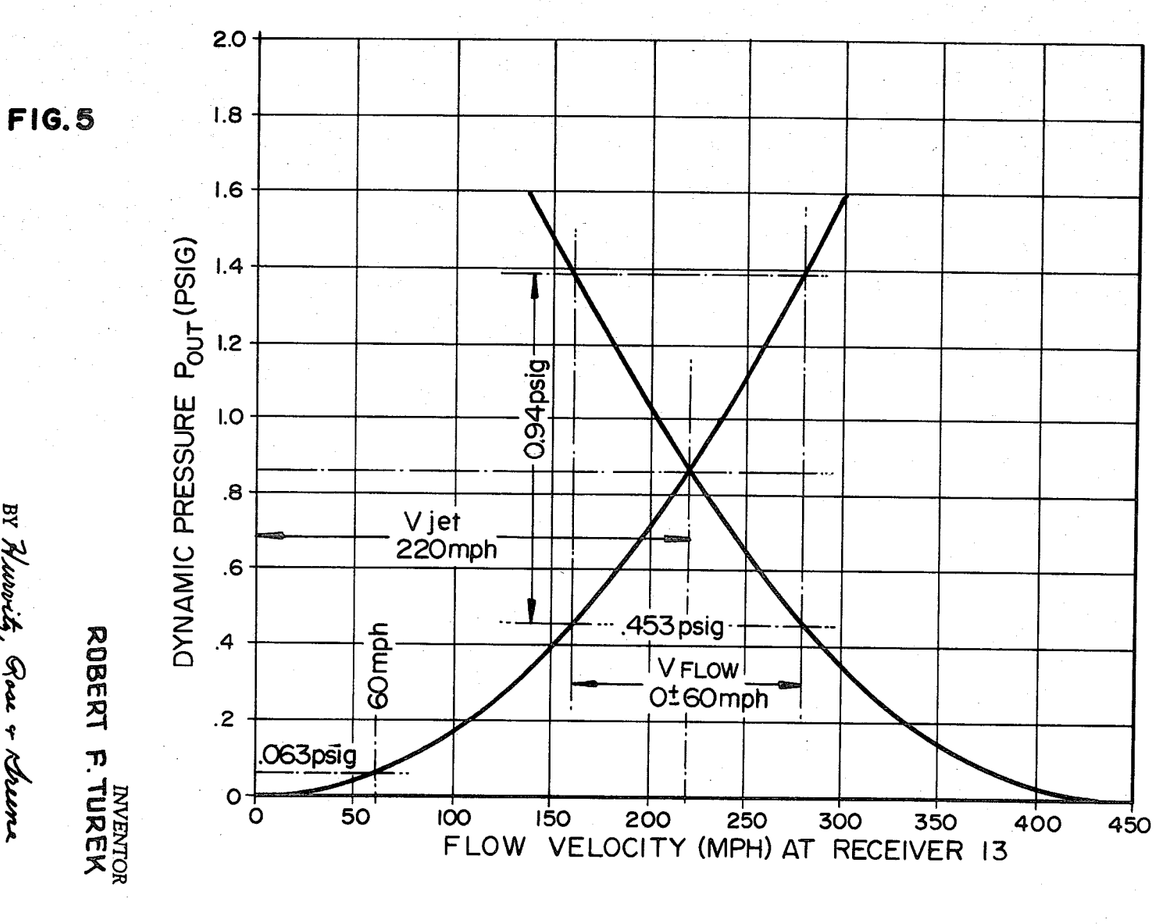
FIG. 5 is a plot of dynamic pressure versus flow velocity for air.

In addition to the greater gain (pressure variation vs. velocity variation) achieved by shifting point Q as described above, it is to be noted that the portion of curve A to which point Q has been shifted is substantially more linear than it is at the low velocity portion of the curve. More specifically, curve A has a finite slope when $V_{flow} = 0$ in the region of point Q whereas for a pitot probe, having a zero velocity quiescent point, the slope is zero when $V_{flow}$ is zero.

It will be understood from the above description that increasing ambient flow velocity or mass flow ($V_{flow}$) in the direction of jet 15 in FIG. 1 produces increasing dynamic pressure in receiver tube 13 ($P_{out}$). Likewise increasing $V_{flow}$ in a direction opposite to that of jet 15 produces decreasing received pressure $P_{out}$. The range for $V_{flow}$ between $0 \pm 60$ mph illustrated along curve A in FIG. 5 assumes a one-to-one coupling between $V_{flow}$ and jet 15. That is, the indicated range for $V_{flow}$ assumes that a ten mph change in $V_{flow}$ produces a 10 mph change in the jet fluid received by receiver tube 13. This is an ultimate goal and not 100 percent achievable in a practical system. Coupling between ambient fluid and jet fluid is, in fact, dependent upon the relative axial alignments of power nozzle 11 and receiver tube 13. The optimum axial location of receiver tube 13 for a given application may not be that which produces coaxial alignment with the power nozzle. This is because the shear or viscous forces acting between the ambient fluid and the jet fluid are at maximum near the edge of the jet; thus the maximum effect of ambient flow on jet 15 is experienced near the edge of the jet. As the receiver is placed closer to axial alignment with the power nozzle, coupling between ambient and jet fluid decreases and the 0 ± 60 mph range for $V_{flow}$ along curve A is compressed. However, the quiescent velocity of jet fluid received by receiver tube 13 decreases as the axial misalignment between nozzle 11 and receiver 13 increases. A reduction in quiescent velocity reduces the gain of the device, acting to shift point Q on curve A of FIG. 5 downward, in terms of dynamic pressure, and to the left, in terms of flow velocity. Thus, with regard to gain, there is trade off to be considered concerning relative alignment between the power nozzle 11 and receiver tube 13. It should be noted however that even where there is a loss in coupling between ambient fluid and jet fluid, the range of $V_{flow}$ is still sufficiently large and experiences a significantly greater slope along curve A about point Q than about point (0,0). The parallel flow sensor therefore permits measurement of low wind velocity changes which are not readily measurable with practical pitot tube arrangements.

Another consideration for maximizing the coupling between the ambient fluid and jet 15 concerns the downstream location of receiver tube 13. Naturally, the longer the distance between nozzle 11 and receiver 13 the greater the coupling between $V_{flow}$ and the jet 15. However, at very large distances, the centerline velocity decreases to a very low value, thereby decreasing the gain of the sensor significantly. The effect is to shift point Q downwardly and to the left along the curve A. As a limit, point Q would approach zero pressure and velocity in which case sensor 10 would perform no better than a simple pitot probe arrangement. Optimization of the nozzle-sensor spacing is thus a consideration to be borne in mind for the particular application to which sensor 10 is employed.

Another consideration to be borne in mind when utilizing sensor 10 is the sizing of the power nozzle 11. The best performance of sensor 10 is generally achieved if jet 15 is turbulent when received at receiver 13 under all operating conditions. If the jet flow is laminar, or if it is in transition between laminar and turbulent flow, considerable transient variations in the velocity profile are likely to occur. This consideration, along with the desired quiescent jet velocity, and the spacing between the nozzle 11 and receiver 13 determines the minimum nozzle diameter. Practical diameters for nozzle 11 are on the order of 1/16 inch.

The inlet or ingress orifice of receiver tube 13 is sized according to the size of the sample of jet 15 which one wishes to collect at receiver 13. This is primarily a function of the flow requirements of the load being fed by the $P_{out}$ signal, the larger the flow requirements, the larger the ingress orifice of tube 13.

Figure 2:
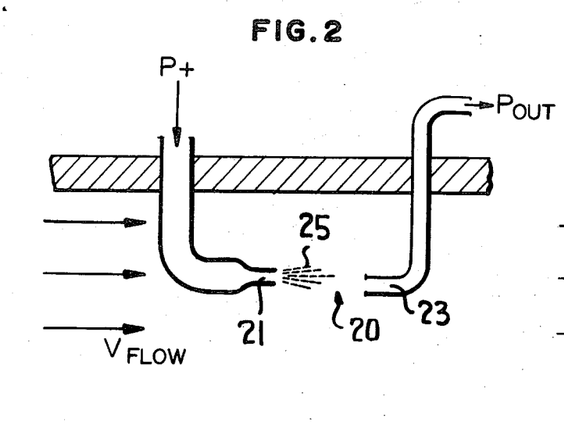
FIGS. 2 and 3 are respective diagrammatic illustrations of modified parallel flow type fluidic flow sensors.

Referring now to FIG. 2 of the accompanying drawings, there is illustrated a somewhat modified flow sensor 20 comprising a power nozzle 21 which issues a jet 25 which in turn is received in part by a receiver tube 23. The difference between sensor 10 of FIG. 1 and sensor 20 of FIG. 2 resides in the fact that power nozzle 21 and receiver tube 23 are axially misaligned for the purpose of optimizing the coupling between $V_{flow}$ and jet 25 in a specific flow sensor application. As described above, this misalignment tends to reduce the gain because it shifts point Q on curve A of FIG. 5 downward and to the left. The advantage of this arrangement, however, resides in the fact that the velocity of the jet fluid received by receiver tube 23 is more sensitive to velocity variations $V_{flow}$ than is the case for sensor 10 in FIG. 1. This tends to more than compensate for the gain loss incurred by the shift of point Q.

Figure 3:
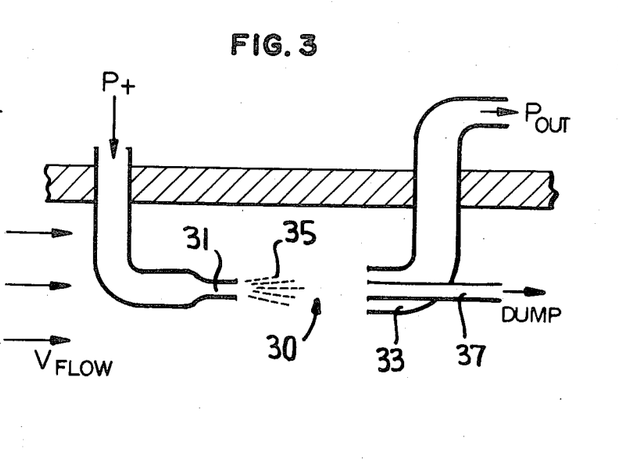

Referring now to FIG. 3 of the accompanying drawings there is illustrated a sensor 30 which is a further modification of sensor 10 of FIG. 1. Sensor 30 comprises a power nozzle 31 which issues a jet of fluid 35 toward a pair of concentric receivers 33 and 37, both of which are coaxially aligned with power nozzle 31, receiver 37 being disposed internally of receiver 33. Outer receiver 33 may be viewed as performing the same function as receiver 23 in FIG. 2; that is, the fluid receiving aperture of outer receiver 33 is off center relative to jet 35 and therefore receives that portion of the jet which is more closely coupled to $V_{flow}$. However, because of the annular configuration of the fluid receiving aperture of receiver 33, the latter receives a larger proportion of stream 35 than receiver tube 23 receives of stream 25. The annular configuration of receiver tube 23 may thus be considered as a means of maximizing flow for those applications where the load driven by signal $V_{out}$ has a high flow requirement.

The inner receiver tube 37 may be connected either to a dump passage or may be utilized in its own right to provide an output signal as a function of $V_{flow}$. It should be noted however that the fluid received by receiver tube 37 is less closely coupled to $V_{flow}$ than is the fluid received by receiver tube 33, and unless receiver 37 is disposed downstream of the constant velocity core of jet 35 there will be no noticeable pressure change in receiver 37 as $V_{flow}$ changes.

Of course if it is desired to increase the flow capability of sensor 10 of FIG. 1 without axially misaligning the receiver tube and without providing an annular outlet receiver, this can be achieved by increasing the P+ as desired.

Figures 4, 6, 7, 8:
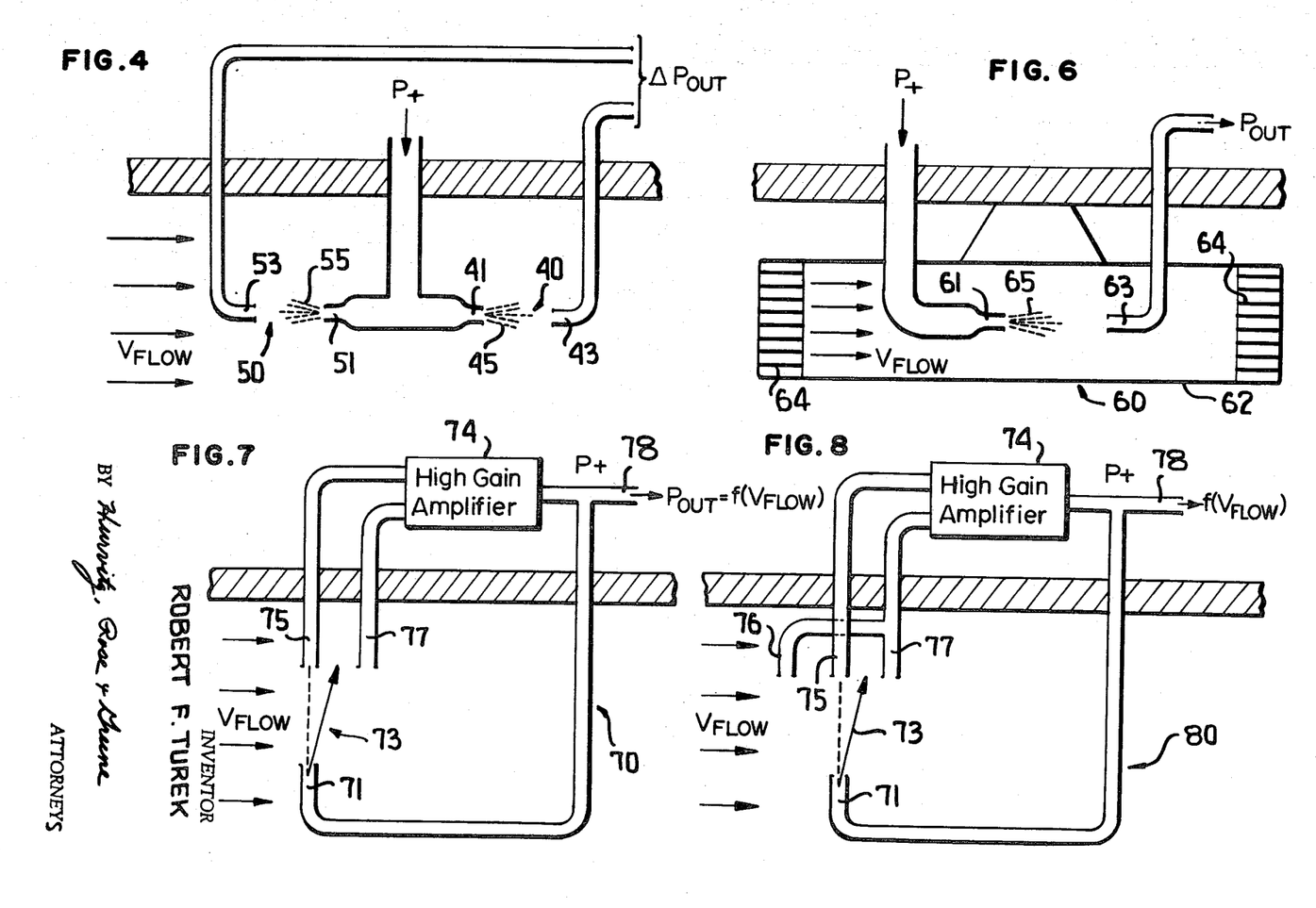
FIG. 4 is a diagrammatic illustration of a two-sided parallel flow type fluidic flow sensor of the push-pull type.
FIG. 6 is another modified form of the parallel flow sensor of FIG. 1.
FIG. 7 is a cross flow type fluidic flow sensor of the present invention.
FIG. 8 is a diagrammatic illustration of a modified cross flow type fluidic flow sensor of the present invention.

Referring now to FIG. 4 of the accompanying drawings there is illustrated a two-sided or push-pull version of the parallel flow sensor wherein two sensors 40 and 50 are arranged such that two sensing jets 45 and 55 are issued parallel to $V_{flow}$ but in opposite directions. More specifically, the pressurized fluid P+ is applied to each of power nozzles 41 and 51 which in turn issue respective jets 45 and 55. Jet 45 is received by receiver tube 43 and jet 55 is received by receiver tube 53. The arrangement of FIG. 4 offers two primary advantages over the single sided sensor of FIG. 1. More specifically, the two-sided circuit of FIG. 4 has a zero null shift in response to changes in the common supply pressure P+. That is, the differential output pressure, Δ

$P_{out}$, across receiver tubes 43 and 53 register zero or null when $V_{flow}$ is zero, regardless of the value of P+. The second advantage of the arrangement of FIG. 4 is that the differential output pressure $\Delta P_{out}$ has an exact linear relationship with $V_{flow}$. This linearity results from the fact that the individual nonlinearities associated with sensors 40 and 50 cancel one another when their respective output pressures are subtracted to provide $\Delta P_{out}$. The above described advantages of the arrangement of FIG. 4 are more clearly understood by referring again to FIG. 5. Curve A represents the dynamic pressure versus received flow velocity characteristic for sensor 40 of FIG. 4 and curve B, a mirror image of curve A, represents the dynamic pressure versus received flow velocity characteristic of sensor 50. $\Delta P_{out}$ is obtained by subtracting curve B from curve A for each value of $V_{flow}$. Curves A and B intersect at point Q, the quiescent operating point at which $V_{flow} = 0$ and $\Delta P_{out} = 0$. Point Q is determined by P+, which if decreased may be considered as having the effect of sliding curve B to the left relative to curve A and to the right if P+ is increased. As is the case for the one-sided sensor 10 of FIG. 1, by lowering P+ the quiescent dynamic pressure at each of receivers 43 and 53 is lowered to a lesser sloping portion of respective curves A and B, thereby decreasing the gain in each of the sensors by the same amount. Since the pressures at nozzles 41 and 51 are always equal, and since it is assumed that the disposition of sensor tube 43 relative to nozzle 41 is the same as the disposition of sensor tube 53 relative to nozzle 51, it is apparent that the two-sided device of FIG. 4 always provides a zero output pressure $\Delta P_{out}$, regardless of the value of P+, whenever $V_{flow}$ is zero.

While the inherent linearity of $\Delta P_{out}$ versus $V_{flow}$ is not intuitively obvious from FIG. 5, such linearity becomes readily apparent upon consideration of the following analysis: Curve A may be described algebraically by the equation $y = ax^2$; Curve B may be described algebraically by the equation $y = ax^2 - bx + c$. The variables $y$ and $x$ in these expressions are analogous to the coordinates dynamic pressure ($P_{out}$) and flow velocity in FIG. 5; $a$ and $b$ are determined by physical constants in the system. The value of $\Delta P_{out}$ in FIG. 4 for any value of $V_{flow}$ is ascertained by merely subtracting curve B from curve A at the corresponding $V_{flow}$ value relative to quiescent point Q. Subtracting the mathematical expressions representing curves A and B, the result is $ax^2 - ax^2 + bx - c = bx - c$, a linear function of $x$. The difference between the expressions is thus linear with respect to $x$ or $V_{flow}$ for all values of $V_{flow}$.

It is to be understood that the axially misaligned configuration of FIG. 2 and the annular receiver configuration of FIG. 3 can each be employed in respective two-sided sensor configurations of the type illustrated in FIG. 4.

Referring now specifically to FIG. 6 of the accompanying drawings there is illustrated another parallel flow sensor 60 embodying the principles of the present invention. The parallel flow sensor as described hereinabove is primarily a single axis instrument; that is, the sensor measures fluid flow along a single axis. It is therefore sometimes necessary according to the environment of the particular sensor application, to provide means for isolating the sensor from ambient flow components other than those along the axis of interest. Sensor 60 accomplishes this function by providing a long cylindrical tube 62 axially aligned with the direction of the flow component to be measured. Power nozzle 61 is arranged to issue a jet of fluid 65 toward receiver 63 in a direction which is parallel to the axis of cylinder 62. Each end of cylindrical tube 62 is provided with a plurality of flow straighteners in the form of multiple tube openings 64. The reason for the flow straighteners is that simple openings at the ends of tube 62 do not accurately capture the required $V_{flow}$ component when $V_{flow}$ is angularly oriented relative to the axis of tube 62. This is because a simple tube opening would cause flow distortion and separation at the lip of the inlet of the tube. The flow straighteners 64 minimize this condition but do have the disadvantage of sacrificing receiving area for the measured flow. However, the resulting small pressure loss introduced by the reduction in receiving area does not appreciably effect the sensor gain.

Figure 13:
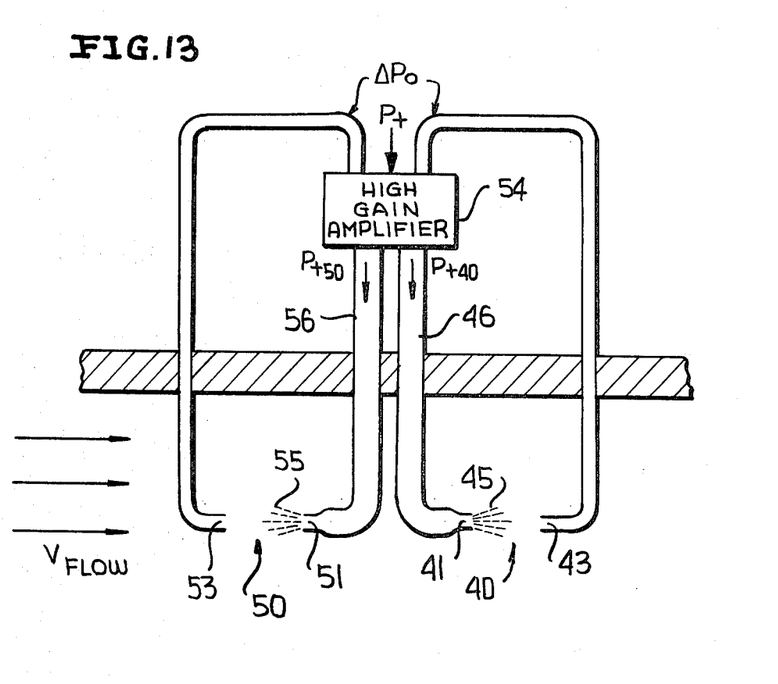
FIG. 13 is a diagrammatic illustration of a two-sided parallel flow sensor of the present invention wherein feedback is employed to extend the operating range of the sensor.

Referring now to FIG. 13 of the accompanying drawings, there is illustrated a modified embodiment of the two-sided parallel flow sensor of FIG. 4. Like elements in FIGS. 4 and 13 are designated by identical reference numerals. The two-sided sensor 40, 50 includes nozzles 41, 51 arranged to issue oppositely directed sensing jets 45, 55 parallel to the sensed flow $V_{flow}$. Receiver tubes 43, 53 are positioned according to the principles described above to receive streams 45, 55 at pressures which are a function of $V_{flow}$. The signals in receiver tubes 43, 53 comprise components of a differential pressure $\Delta P_o$ which is applied to a high gain amplifier 54. The latter, for example, may be a fluidic operational amplifier of the type described in U. S. Pat. No. 3,468,324, and responds to extremely small variations in $\Delta P_o$ to provide greatly amplified differential pressure variations across its output passages 56, 46. Output passage 56 provides supply pressure P+$_{50}$ to nozzle 51 and passage 46 provides supply pressure P+$_{40}$ to nozzle 41.

The negative feedback operation of amplifier 54 tends to maintain $\Delta P_o$ substantially constant while varying P+$_{50}$ and P+$_{40}$ as a function of $V_{flow}$. If we assume a constant value for $\Delta P_o$ (for example, null), a variation in $V_{flow}$ tends to vary $\Delta P_o$, as described in relation to FIG. 4. However, amplifier 54 greatly amplifies even slight variations in $\Delta P_o$ to reapportion the supply pressures applied to nozzles 41, 51 whereby to maintain $\Delta P_o$ constant. More specifically, if $V_{flow}$ increases in the direction of flow illustrated in FIG. 13, the pressure at receiver 43 tends to increase whereas that at receiver 53 tends to decrease. Amplifier 54 responds by increasing P+$_{50}$ and decreasing P+$_{40}$ to restore $\Delta P_o$ to its constant value. Pressure or flow taps may be employed in conjunction with either or both of passages 56 and 46 to provide an amplified output signal as a function of $V_{flow}$. If a differential output signal is required, both of passages 56, 46 can be thusly tapped.

An important advantage of the feedback approach illustrated in FIG. 13 is the fact that it permits measurement of $V_{flow}$ over a significantly larger range than is possible without the feedback. This is true because large values of $V_{flow}$ (i.e. — in excess of the velocity of flow rate of jet 55) could swamp out the effects of one of the sensors (40, 50) and negate the advantages of a double-sided device. With the use of P+ feedback, however, the sensing jet velocities of flow rates are automatically varied with $V_{flow}$ to prevent swamping. In addition, of course, the P+ feedback approach provides a built in amplification for the output signal so that further amplification is not required to register even very small variations in $V_{flow}$.

Figure 14:
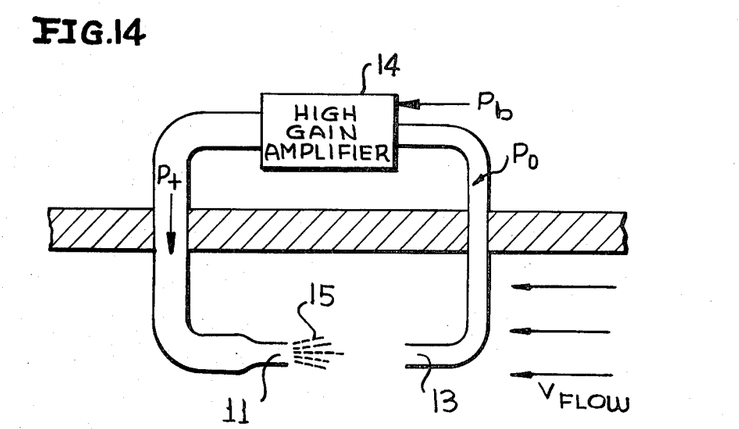
FIG. 14 is a diagrammatic illustration of a single-sided parallel flow sensor employing feedback.

The use of feedback with the parallel flow sensing technique is also applicable to single-ended sensors, as illustrated in FIG. 14. In that figure a single ended device 10 is illustrated and includes elements designated by the same reference numerals employed in FIG. 1 for like elements. A power nozzle 11 receives pressurized supply fluid P+ and issues a sensing jet 15 toward aligned receiver 13. The latter receives the sensing jet at a pressure $P_o$ which is a function of $V_{flow}$. Jet 15 is issued parallel to $V_{flow}$ and, by way of example only, opposite to $V_{flow}$. $P_o$ is applied to a high gain amplifier 14 (for example, of the same type as high gain amplifier 54 in FIG. 13) along with a bias pressure $P_b$. The output signal from amplifier 14 is P+, which is applied to nozzle 11.

The operation of the embodiment of FIG. 14 follows the same principles described in relation to FIG. 13. $P_o$ is maintained substantially constant, at a value determined, in part, by bias pressure $P_b$. This is achieved by virtue of amplifier 14 which greatly amplifies any tendency of $P_o$ to vary and thereby varies P+ in the opposite sense. For example, if $V_{flow}$ increases from right to left, $P_o$ tends to decrease. Amplifier 14 reacts by increasing P+ to maintain $P_o$ constant. It should be noted that if $V_{flow}$ were directed from left to right in FIG. 14, increasing $V_{flow}$ would result in decreasing P+.

Referring now specifically to FIG. 7 of the accompanying drawings there is illustrated a flow sensor 70 of the cross-flow type, constructed in accordance with the principles of the present invention. A power nozzle 71 is arranged to issue a power jet 73 in a direction perpendicular to the direction of measured flow. Receiver tubes 75 and 77 are co-planar with jet 73, are asymetrically disposed relative thereto, and are in receiving relationship therewith to provide a differential pressure output signal $\Delta P_{out}$ across the receiver tubes as a function of power stream deflection. In the particular embodiment of FIG. 7, receiver 75 is axially aligned with nozzle 71 and receiver 77 is displaced therefrom in a downstream sense relative to $V_{flow}$. Signal $\Delta P_{out}$ is applied to a high gain amplifier 74 which may or may not be of the fluidic type as particular system usage dictates. By way of example, amplifier 74 may be a fluidic high gain amplifier of the type as described in U. S. Pat. application Ser. No. 503,787 filed Oct. 23, 1965, now Pat. No. 3,468,324 by Gerald Schrader, entitled "Limiting Amplifier" and assigned to the same assignee as the present invention. The output signal from amplifier 74 provides the P+ supply pressure to power nozzle 71 thereby forming a negative feedback circuit. The P+ pressure is detected at pickoff 78 to provide an output signal $P_{out}$ for sensor 70.

Fundamental to the operation of sensor 70 is that the $\Delta P_{out}$ signal across receivers 75 and 77 is kept at substantially zero by the high gain negative feedback circuit. To accomplish this the jet is always deflected to a point approximately midway between receivers 75 and 77. As the velocity of $V_{flow}$ increases, the jet 73 tends to deflect toward receiver 77 causing a highly amplified change in P+ at nozzle 71. It is because of this change in P+ that the jet is maintained midway between receivers 75 and 77. More particularly, increasing P+ increases the velocity of jet 73. The greater the jet velocity the more the jet resists deflection by $V_{flow}$. P+ is made to vary as a direct function of $V_{flow}$ and therefore the signal $P_{out}$, provided by pickoff tube 78, is a function of $V_{flow}$.

The feedback circuit illustrated in FIG. 7 i by no means limited to flow velocity measuring. For example, the asymetrical configuration of nozzle 71 and receivers 75 and 77 may be utilized in a proportional fluidic amplifier wherein a control signal rather than a flow velocity such as $V_{flow}$ corresponds to the input condition. In such a case $P_{out}$, which again is a measure of P+, is a function of the input condition.

Referring now to FIG. 8 of the accompanying drawings there is illustrated a modified cross flow sensor 80 which is similar to sensor 70 of FIG. 7 but is provided with an additional receiver tube 76. Like elements in FIGS. 7 and 8 are provided with identical reference numerals. In sensor 80, power nozzle 71 is in substantial alignment with central receiver tube 75, and receiver tubes 76 and 77 are symmetrically disposed on opposite sides of receiver tube 75. Receivers 76 and 77 are joined to provide a common signal, which along with the signal at receiver 75 comprises the differential pressure $\Delta P_{out}$. The advantage of sensor 80 over that of sensor 70 resides in the fact that sensor 80 can monitor $V_{flow}$ in either of two directions. Sensor 70 on the other hand can monitor $V_{flow}$ only in the direction indicated by the arrows associated with $V_{flow}$ in FIG. 7.

The operation of sensor 80 is identical to that of sensor 70 and the P+ signal applied to power nozzle 71 by amplifier 74 is a function of the $V_{flow}$ signal which acts against power jet 73. Depending upon the direction of $V_{flow}$, the jet is maintained deflected between receivers 75 and 76 or 75 and 77 to maintain $\Delta P_{out} = 0$.

It will be appreciated that the signal appearing at pickoff tube 78 in sensor 80 is a measure of the magnitude only and of itself cannot discern the direction in which $V_{flow}$ is flowing. This may be sufficient for some system applications. Where flow direction information is required the fluid pressures received by sensor tubes 76 and 77 must be sensed to determine which tube is receiving the larger pressure and hence the direction of $V_{flow}$. A fluidic circuit suitable for detecting which of the two signals appearing at receivers 76 and 77 is larger is disclosed in U. S. Pat. No. 3,503,423. Small pressure samples from each of receiver tubes 76 and 77 could be applied as input pressures to the signal selector of the above referenced patent application to provide an indication of direction of $V_{flow}$ in FIG. 8.

It is to be understood that the power jets in FIGS. 7, 8 need not be directed perpendicular to $V_{flow}$. The greatest sensitivity is achieved when perpendicular orientation is provided; however, the component of $V_{flow}$ perpendicular to the jet will be sensed if $V_{flow}$ and the jet are not perpendicularly oriented.

Figures 9, 10, 11:
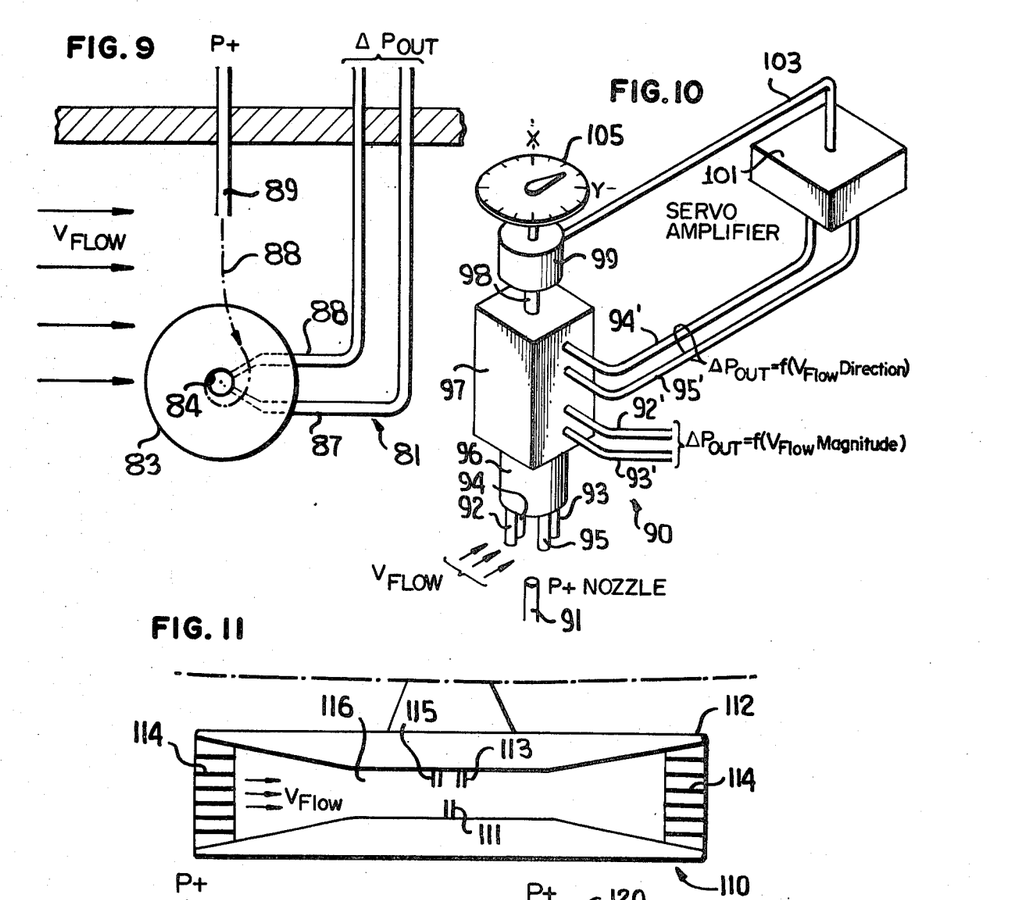
FIG. 9 is a diagrammatic illustration of the cross flow vortex type flow sensor of the present invention.
FIG. 10 is a diagrammatic illustration of the cross flow type fluidic flow sensor of FIG. 8 modified to operate in a two axis mode.
FIG. 11 is a diagrammatic illustration of a modified fluidic flow sensor of the type illustrated in FIG. 7.

Referring now to FIG. 9 of the accompanying drawings there is illustrated a cross flow vortex sensor configuration 81 according to the principles of the present invention. Sensor 81 comprises a vortex amplifier 83 having an axial drain passage 84 with which a pair of sensor tubes 85 and 87 communicate to provide a differential output pressure Δ P_{out} as a function of the helical component of flow in drain passage 84. The configuration of vortex amplifier 83 may, for example, be similar to that described in copending U. S. application Ser. No. 566,082 filed July 18, 1966 now abandoned, by Francis M. Manion and entitled "Angle of Attack Sensor".

A power nozzle 89 is adapted to issue a jet 88 of fluid perpendicular or angularly with respect to the $V_{flow}$ component being monitored. Jet 88 flows across a gap between nozzle 89 and vortex amplifier 83, $V_{flow}$ being directed across this gap. Nozzle 89 is aligned perpendicular to the axis of drain passage 84 and coplanar therewith so that in the absence of $V_{flow}$ jet 88 enters the vortex amplifier 83 and flows radially thereacross and through drain passage 84. The resulting flow through drain passage 84 is wholly axial, with no helical components, and the output differential pressure Δ P_{out} across passages 85 and 87 is zero.

In the presence of a $V_{flow}$ component, jet 88 is deflected in proportion to that component and therefore introduces a tangential flow component into vortex amplifier 83. This tangential flow component creates vortical flow in amplifier 83 and helical flow in drain passage 84, the helical flow being proportional to the deflection of jet 88. Consequently the output pressure Δ P_{out} across passages 85 and 87 is proportional to $V_{flow}$.

It is also to be noted that in the sensor 81 of FIG. 9 the polarity of Δ P_{out} changes as the direction of $V_{flow}$ changes so that no additional polarity sensor is required as is the case for sensor 80 in FIG. 8. Δ P_{out} is therefore a function of $V_{flow}$ and sensitive to $V_{flow}$ in both directions. A very low tangential velocity of jet 88 at the outer radius of a vortex chamber is accelerated by the conservation of momentum effects within the vortex amplifier 83 as the flow approaches the center. This phenomonon, used extensively in vortex rate sensors, permits resolution of very low inertial rotational rates. For example, with a vortex chamber diameter of approximately 2 inches tangential speeds of less than 0.2 feet per minute may be resolved.

Cross flow sensing as described herein is not limited to sensing one wind velocity component. By allowing the wind or measured flow to deflect the power jet in two directions, flow components in each direction can be sensed with one instrument. This idea is described in the above referenced U.S. Pat. No. 3,343,413 in reference to a cross flow measuring technique which, as described above, is useful for only a very limited range of flow rates. In addition, the two-axis sensing scheme described in said patent is inaccurate unless the measured flow is directed precisely parallel to one of the two axes.

Several implementations of accurate two axis flow sensing are possible. One such implementation would use a multiplicity of receiver tubes arranged in a circle with the circle center in alignment with a jet nozzle. A pair of opposed receivers with the highest differential pressure could be selected by a maximum signal selector of the type referred to above, and this pair would indicate the direction angle of $V_{flow}$. The magnitude and polarity would be determined as previously described for a single axis sensor of the type illustrated in FIGS. 7, 8 and 9. To obtain an angular resolution of ± 5° in this type of sensor, 36 receivers or 18 receiver pairs are required. It seems reasonable to avoid this complexity where system requirements permit. A more practical concept for two axis measurement using only two pairs of receivers is embodied in FIG. 10.

In FIG. 10 a two axis flow sensor system 90 comprises a power nozzle 91, a rotatable frame 96 which supports a first pair of receiver tubes 92 and 93 and a second pair of receiver tubes 94 and 95. Frame 96 is rotatable about the longitudinal axis of nozzle 91. The receiver tubes in each pair define respective planes with nozzle 91, the planes so defined being mutually perpendicular. Power nozzle 91 is axially centered between all four of receiver tubes 92, 93, 94 and 95.

Each of receiver tubes 92, 93, 94 and 95 extends through frame 96 and is connected to a respective slip ring in a pneumatic slip ring assembly 97. Each of the slip rings in assembly 97 also communicate with a respective one of outlet passages 92', 93', 94' and 95' so that fluid communication between receiver 92 and passage 92', between receiver 93 and passage 93', between receiver 94 and passage 94', and between receiver 95 and passage 95', is assured even during rotation of frame 96 relative to the pneumatic slip ring assembly 97.

Frame 96 is rotatable by a shaft 98 which in turn is driven by an actuator member 99.

An amplifier 101, for example a fluidic amplifier of the proportional type, is fed by signals in passages 94' and 95' and responds to variations in the differential pressure appearing across these passages to provide a corresponding pressure signal at outlet passage 103. The pressure signal at outlet passage 103 drives actuator 99.

In operation, receiver pair 94 and 95 is employed to control rotation of frame 96 by means of the servo amplifier 101 and servo actuator 99 so as to keep the differential pressure across passages 94' and 95' equal to zero. In other words, when $V_{flow}$ is in any direction other than perpendicular to the plane of receiver tubes 94 and 95, the differential pressure across passages 94' and 95' applies a signal at output passage 103 of servo amplifier 101. This causes actuator 99 to rotate the shaft 98 accordingly until the plane of receiver tubes 94 and 95 is oriented perpendicular to $V_{flow}$. When the plane of receiver pair 94 and 95 are thus perpendicular to $V_{flow}$, the differential pressure appearing across receiver pair 92 and 93 is aligned with $V_{flow}$ such that a differential pressure appearing thereacross is directly proportional to the magnitude of $V_{flow}$. A rotary gage member 105 linked to shaft 98 serves as a shaft position indicator and hence as a measure of the angle of $V_{flow}$.

Servo amplifier 101 may be either pneumatic, electrical, or fluidic. Likewise actuator 99 may be either pneumatic or electrical, and if pneumatic could by way of example be of the type described in abandoned U. S. Pat. application Ser. No. 489,988, filed Sept. 24, 1965, now abandoned, by Carmine V. DeCamillo, and entitled "Fluid Motor Control Systems".

Referring now to FIG. 11 of the accompanying drawings there is illustrated a further modification of the cross flow sensor described above in relation to FIG. 7. More particularly, sensor 110 in FIG. 11 comprises a power nozzle 111 and a pair of receiver tubes 113 and 115. Like sensor 60 in FIG. 6, sensor 110 employs a cylindrical tube 112 to provide isolation of the desired component of $V_{flow}$ to be measured. Flow straighteners 114 at either end of tube 112 perform the same function as do flow straighteners 64 in FIG. 6, namely to minimize flow distortion and separation at the lip of the inlet of cylinder 112.

The interior walls of cylinder 112 are configured to form a venturi section 116 axially arranged along the cylindrical tube 112, with the power nozzle 111 and receiver tubes 113 and 115 disposed in the center of the venturi. The function of the venturi section is to augment the monitored component of $V_{flow}$ as that component interacts with the power jet issued by nozzle 111, thereby increasing the sensitivity of the sensor. The venturi section 116 is symmetrically disposed with respect to the ends of cylindrical tube 112 to provide the same augmentation characteristic for both flow directions through the cylindrical tube.

As is readily apparent, the augmentation feature provided by venturi section 116 is equally applicable to both the cross flow and the parallel flow techniques described herein.

Figure 12:
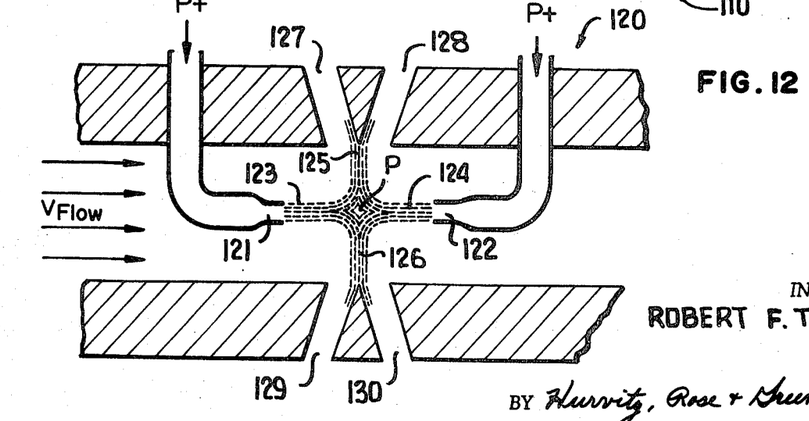
FIG. 12 is a diagrammatic illustration of a fluidic flow sensor employing both parallel and cross flow sensing techniques.

Referring now to FIG. 12 of the accompanying drawings there is illustrated a flow sensor 120 which combines the principles of both parallel and cross flow sensing. A pair of axially aligned nozzles 121 and 122 are supplied with pressurized fluid P+ and disposed to issue respective coaxial impacting jets 123 and 124. Jets 123 and 124 are directed parallel to the component of $V_{flow}$ being measured and, in the absence of $V_{flow}$ the jets impact at some point P. A pair of oppositely directed resultant fluid streams 125, 126 emanate from the impact point, flowing radially therefrom at an angle dependent upon the relative momenta of jets 123 and 124. As thus far described, the arrangement in FIG. 12 is recognized as being similar to the fluidic impact modulator.

A first pair of outlet passages 127, 128 are disposed in receiving relationship with stream 125 and provide a differential output pressure thereacross as a function of the position of stream 125. A second pair of outlet passages 129 and 130 are arranged in receiving relationship with stream 126 and provide a differential pressure thereacross as a function of the position of stream 126.

In operation, when $V_{flow}$ is zero the impact point P is centered relative to outlet passages 127 and 128 and relative to outlet passages 129 and 130. Resultant streams 125 and 126 are therefore equally divided between their respective outlet passages and zero pressure differential appears across both pair of outlet passages. Assuming a $V_{flow}$ component toward the right as viewed in FIG. 12, the $V_{flow}$ fluid interacts with jets 123 and 124 as described above in relation to the parallel flow sensor. Consequently fluid in jet 123 experiences an increase in velocity and fluid in jet 124 experiences a decrease in velocity. This causes impact point P to shift to the right to a degree determined by the magnitude of $V_{flow}$. The resultant streams 125 and 126 thus emanate from the shifted impact point, increasing the pressure in outlet passages 128 and 130 and decreasing the pressure in outlet passage 127 and 129. Additionally, resultant streams 125 and 126 are deflected to the right (as viewed in FIG. 12) by $V_{flow}$, further increasing the pressure in passages 128 and 130 and decreasing the pressure in passages 127 and 129. The combined parallel and cross flow sensing provides a high gain output pressure versus $V_{flow}$ characteristic for sensor 120.

The sensing capability of sensor 120 is bi-directional in the sense that flow to the left in FIG. 12 provides higher pressures at passages 127 and 129 whereas flow to the right produces higher pressures at passages 128 and 130.

It should be apparent that sensor 120 may be operated in a feedback mode analogous to the operation of the embodiment of FIG. 13. In such operation, the differential pressure across passages 127, 128 (or 129, 130) can drive a high gain amplifier which in turn would apportion P+ between nozzles 121, 122.

It should be pointed out that the fluids employed to provide the power jets in the sensors disclosed herein need not be the same fluid comprising $V_{flow}$. If the two fluids are of the same density, the system has the advantage of being independent of gravity gradient considerations; however, different fluids may be utilized as system requirements demand.

There are several considerations which have importance in the various sensor configurations as relates to the effects of the temperature of both the $V_{flow}$ fluid and the power jet fluid. The interaction between the jet and $V_{flow}$ is a momentum interchange in the case of the cross flow sensor and a viscous shear force in the case of the parallel flow sensor. The question is one of how temperature effects these interactions.

The shear forces associated with the parallel flow sensor are a function of the effective viscosity of the $V_{flow}$ fluid temperature and the degree of turbulence in the jet. The variation in $V_{flow}$ fluid temperature therefore has some effect on the gain of the parallel flow configuration; however, the extent to which this must be considered depends upon the tolerable temperature sensitivity of the system in which the sensor is employed. The same is true for variations in jet temperature which in some instances vary more than the $V_{flow}$ fluid temperature as the source power is varied. It may be appropriate to cool the jet fluid source to a lower temperature to reduce the extent of this variation. Again this depends upon system considerations.

In the cross flow configuration, the jet momentum does not change with temperature. At a fixed velocity however the $V_{flow}$ fluid momentum does change, varying inversely with temperature. This causes a change in the sensor gain, and therefore this effect must be considered in certain sensor applications.

Another consideration to be borne in mind when employing the sensors of the present invention is the ambient static pressure. For example, when the sensors described herein are employed as wind measuring devices, the momentum flux of both the wind and the jet flow is a function of the respective air densities, which in turn are determined in part by the static air pressure. This pressure of course varies with altitude. Where the instrumentation is primarily intended for use in a ground level environment, the static pressure does not vary over a wide range. However, in aircraft the sensor may be operating at altitudes on the order of 10,000 feet above sea level or higher and this aspect must therefore be considered.

While I have described and illustrated specific embodiments of my invention, it will be clear that variations of the details of construction which are specifically illustrated and described may be resorted to without departing from the true spirit of the invention as defined in the appended claims.

I claim:

1. A fluidic sensor for monitoring the flow of a fluid stream over a predetermined range of flows, said sensor comprising:
   first means responsive to application of pressurized fluid thereto for issuing a power jet of fluid into interaction with said fluid stream such that flow of said jet is varied by flow variations of said fluid stream;
   receiver means disposed for receiving fluid from said jet and located relative to said first means such that the pressure of said power jet at said receiver means varies with flow variations of said fluid stream over the range of flows to be sensed; and
   feedback means responsive to jet fluid received by said receiver means for applying pressurized fluid to said first means at a pressure which is a predetermined function of the pressure of jet fluid received by said receiver means.

2. The sensor according to claim 1 wherein said power jet is issued from a nozzle disposed within said fluid stream and having a longitudinal axis extending in a direction parallel to said fluid stream.

3. The sensor according to claim 1 wherein said power jet is issued in a direction generally perpendicular to said fluid stream.

4. A sensor for monitoring flow of a fluid stream, comprising:
   nozzle means responsive to application of variable pressure supply fluid thereto for issuing a variable pressure power jet of supply fluid into said fluid stream such that a predetermined component of flow of said power jet is varied in response to variations in said fluid stream flow;
   means for applying supply fluid to said nozzle means;
   receiver means disposed for receiving power jet fluid at a pressure which tends to vary with variations in said fluid stream flow; and
   feedback means for maintaining substantially constant the pressure of jet fluid received by said receiver means, said feedback means including means responsive to fluid received by said receiver means for varying the pressure of supply fluid applied to said nozzle means.

5. The sensor according to claim 4 wherein said predetermined flow component of said power jet is directed parallel to the flow direction of said fluid stream.

6. The sensor according to claim 4 wherein said predetermined flow component of said power jet is directed substantially perpendicular to the flow direction of said fluid stream.

7. A fluidic sensor for monitoring the flow of a fluid stream over a predetermined range of flows, said sensor comprising:
   a nozzle arranged to be disposed in a fluid stream and responsive to pressurized fluid applied thereto for issuing a power jet of fluid within said fluid stream and parallel to the flow direction of said fluid stream;
   receiver means arranged to be disposed in said fluid stream for receiving a portion of said power jet and located relative to said nozzle such as to receive a portion of said power jet the dynamic pressure of which varies as a function of the flow of said fluid stream over a predetermined range of flows.

8. A fluidic sensor for monitoring a predetermined flow component of a fluid stream, said sensor comprising:
   means for issuing a power jet of fluid from a location within and in a direction parallel to said predetermined flow component and in interacting relationship with said fluid stream such that at least a portion of said power jet is viscously coupled to said fluid stream and experiences velocity variations as a function of variations in said predetermined flow component of said fluid stream; and
   output means for receiving said portion of said power jet and located relative to said means for issuing such as to receive a portion of said power jet which varies as a function of the velocity of said fluid stream.

9. The fluidic sensor according to claim 8 wherein said means for issuing comprises a nozzle disposed within said fluid stream and having a longitudinal axis extending parallel to the direction of flow of said fluid stream.

10. The sensor according to claim 9 wherein said output means comprises a receiver tube having an ingress opening which is coaxially aligned relative to said power jet.

11. The sensor according to claim 9 wherein said output means comprises a receiver tube having an ingress opening which is coaxially misaligned relative to said power jet.

12. The sensor according to claim 9 wherein said output means comprises a first receiver tube having an ingress opening which is coaxially aligned relative to said power jet and a second receiver tube having an ingress opening concentrically disposed about the ingress opening of said first receiver tube, wherein said fluid pressure in said second receiver tube corresponds to said output pressure.

13. The sensor according to claim 9 further comprising:
   means for issuing a second power jet of fluid in a direction opposite to the direction of said first-mentioned power jet and in interacting relationship with said fluid stream such that at least a portion of said second power jet experiences velocity variations as a function of variations in said predetermined component of said fluid stream; and
   further output means for receiving said portion of said second power jet and for providing a second output pressure which varies as a function of the velocity of said portion of said second power jet.

14. The sensor according to claim 13 wherein said portion of said first-mentioned power jet and said portion of said second power jet experience substantially equal and opposite velocity variations in response to variations in said predetermined flow component of said fluid stream, whereby the pressure difference between said first mentioned output pressure and said second output pressure is a linear function of said predetermined flow component of said fluid stream.

15. The sensor according to claim 9 further comprising means for isolating said predetermined flow component of said fluid stream comprising a hollow cylindrical member disposed in said fluid stream about said power jet and said output means with the longitudinal axis of said cylindrical member extending parallel to said predetermined flow component of said fluid stream, said cylindrical member having flow straightening means disposed at both ends thereof for minimizing flow distortion through said cylindrical member.

16. The sensor according to claim 15 wherein the inner wall of said cylindrical member is configured to form a venturi flow section with said power jet disposed therein, whereby said predetermined flow component of said fluid stream is augmented in the region of said power jet.

17. The sensor according to claim 9 wherein said output means includes feedback means for maintaining the pressure of received power jet fluid substantially constant, said feedback means including means responsive to received power jet fluid for varying the pressure at which said power jet is issued.

18. The fluidic sensor according to claim 8 wherein said power jet includes a central core of substantially constant pressure and velocity, and wherein said receiver means is disposed to receive said portion of said power jet outside said central core.

19. The sensor according to claim 9 further comprising means for isolating said predetermined flow component of said fluid stream comprising a hollow cylindrical member disposed in said fluid stream about said power jet and said output means with the longitudinal axis of said cylindrical member extending parallel to said predetermined flow component of said fluid stream.

20. A fluidic sensor for monitoring flow of a fluid stream comprising:
a power nozzle responsive to application of pressurized fluid thereto for issuing a power jet of fluid into interacting relationship with said fluid stream and generally perpendicular to said fluid stream;
receiver means for providing a differential pressure as a function of deflection of said power jet by said fluid stream; and
feedback means responsive to said differential pressure for varying the pressure of fluid applied to said power nozzle as a function of said differential pressure to maintain said power jet deflected to a position in which said differential pressure is nulled, whereby the pressure of the fluid applied to said power nozzle is a measure of the flow of said fluid stream.

21. A fluidic sensor for monitoring a predetermined flow component of a fluid stream, said sensor comprising:
means for issuing a power jet of fluid having a jet flow component directed perpendicular to said predetermined flow component and in interacting relationship with said fluid stream;
first and second receiver tubes disposed in receiving relationship to said power jet and co-planar with said predetermined flow component, said receiver tubes being disposed such that a differential pressure appears thereacross as a function of deflection of said power jet;
negative feedback means including a high gain amplifier and responsive to said differential pressure for varying the dynamic pressure of said power jet as necessary to maintain said differential pressure substantially constant, whereby the dynamic pressure of said power stream is a measure of said predetermined flow component of said fluid stream.

22. The sensor according to claim 21 wherein said first and second receiver tubes are asymmetrically disposed relative to the undeflected position of said power jet.

23. The sensor according to claim 22 wherein said first sensor tube is disposed to receive said power jet when undeflected and said second receiver tube is disposed to receive said power jet when deflected in a first sense by said predetermined flow component of said fluid stream.

24. The sensor according to claim 23 further comprising:
a third receiver tube disposed to receive said power jet when deflected in a second sense opposite said first sense by said predetermined flow component of said fluid stream, said second and third receiver tubes being symmetrically disposed relative to the undeflected position of said power jet; nd
means for combining power jet fluid received by said second and third receiver tubes such that said differential pressure is the pressure difference between fluid received by said first receiver tube and the combined fluid received by said second and third receiver tubes.

25. The sensor according to claim 21 further comprising means for isolating said predetermined flow component of said fluid stream comprising a hollow cylindrical member disposed in said fluid stream about said power jet and the ingress ends of said receiver tubes with the longitudinal axis of said cylindrical member extending parallel to said predetermined flow component of said fluid stream, said cylindrical member having flow straightening means disposed at both ends thereof for minimizing distortion of fluid stream flow through said cylindrical member.

26. The sensor according to claim 25 wherein the inner wall of said cylindrical member is configured to form a venturi flow section for augmenting said predetermined flow component in the region of said power jet.

27. A fluidic sensor for monitoring a predetermined flow component of a fluid stream, said sensor comprising:
means for issuing two parallel and coaxial power jets of fluid in a direction parallel to said predetermined flow component and in interaction relationship with said fluid stream such that at least a portion of each of said power jets experiences velocity variations as a function of variations in said predetermined flow component of said fluid stream; and
output means for monitoring the relative velocity variations imparted to said portions of said jets by said predetermined flow component of said fluid stream.

28. The fluidic sensor according to claim 27 wherein said power jets are issued in impacting relation to create a resultant stream of fluid emanating from the point at which said jets impact and having a flow component directed transversely of said fluid stream, whereby the impact point of said jets varies with the flow of said fluid stream and said resultant stream is deflected as a function of the flow of said fluid stream.

29. A two-axis fluidic flow sensor for monitoring the flow of a fluid stream in a predetermined plane, said sensor comprising:
   means for issuing a power jet of fluid through said fluid stream and perpendicular to said predetermined plane;
   first receiver means for providing a first differential pressure signal as a function of deflection of said power jet by said fluid stream in one plane perpendicular to said predetermined plane;
   second receiver means for providing a second differential pressure as a function of deflection of said power jet by said fluid stream in a second plane perpendicular to both said predetermined plane and said one plane;
   control means responsive to said second differential pressure for rotating said first and second receiver means about an axis parallel to said power jet whenever said second differential pressure differs from a specified pressure and until deflection of said power jet is wholly within said one plane.

30. The sensor according to claim 29 further comprising means for indicating the angular position of said first and second receiver means.

31. A fluidic circuit responsive to fluid input signals, said circuit comprising:
   a power nozzle responsive to application of pressurized fluid thereto for issuing a power jet of fluid;
   means responsive to said fluid input signal for deflecting said power jet as a function of said input signal;
   receiver means for providing a pressure signal as a function of deflection of said power jet; and
   feedback means responsive to said pressure signal for varying the pressure of fluid applied to said power nozzle as a function of said pressure signal to maintain said power jet deflected to a position in which said pressure signal is a predetermined pressure, whereby the pressure of the fluid applied to said power nozzle is a measure of said fluid input signal.

32. A fluidic sensor for monitoring a predetermined flow parameter in a system, said sensor comprising:
   means for issuing a power jet of fluid;
   means for applying a deflecting force against said power jet as a function of said parameter;
   first and second receiver tubes disposed in receiving relationship to said power jet and disposed such that a differential pressure appears across said receiver tubes as a function of deflection of said power jet;
   negative feedback means, including a high gain amplifier, responsive to said differential pressure for varying the dynamic pressure of said power jet to maintain said differential pressure substantially constant, whereby the dynamic pressure of said power stream is a measure of said parameter.

33. A fluidic sensor for monitoring velocity of a fluid stream comprising:
   a power nozzle responsive to application of pressurized fluid thereto for issuing a power jet of fluid into interacting relationship with said fluid stream and generally perpendicular to said fluid stream;
   receiver means for providing a differential pressure as a function of deflection of said power jet by said fluid stream; and
   feedback means responsive to said differential pressure for opposing deflection of said power jet by said fluid stream as a function of said differential pressure to maintain said power jet deflected to a position in which said differential pressure is constant.

34. A fluidic sensor for monitoring a predetermined flow parameter in a system, said sensor comprising:
   means for issuing a power jet of fluid;
   means for applying a deflecting force against said power jet as a function of said parameter;
   first and second receiver tubes disposed in receiving relationship to said power jet and disposed such that a differential pressure appears across said receiver tubes as a function of deflection of said power jet;
   negative feedback means, including a high gain amplifier, responsive to said differential pressure for varying the deflection of said power jet to maintain said differential pressure substantially constant.

35. A fluidic element responsive to a fluid input signal, comprising:
   first means responsive to application of pressurized fluid thereto for issuing a power jet of fluid into interaction with said fluid input signal such that flow of said power jet is varied by flow variations of said fluid input signal;
   receiver means disposed for receiving power jet fluid at a pressure which varies with flow variations of said fluid input signal;
   means for applying pressurized fluid to said first means; and
   feedback means for maintaining constant the pressure of jet fluid received by said receiver means, said feedback means including means responsive to fluid received by said receiver means for varying the pressure supply fluid applied to said first means.

36. The method of monitoring the flow of a fluid stream comprising the steps of:
   issuing a power jet of fluid into viscous interaction with said fluid stream from a location within said fluid stream and along an axis parallel to said flow of said fluid stream, said power jet having a central core of substantially constant pressure and velocity; and
   receiving said power jet at a location outside said core as a function of the velocity of said fluid stream.

37. A fluidic sensor for monitoring a parameter of a flowing stream of fluid, said parameter being variable over a predetermined range, said sensor comprising:
   means for issuing a power stream into said stream of fluid;
   a receiver disposed in said stream of fluid and positioned to receive said power stream;
   said receiver located such that the flow characteristic of said power stream received by said receiver is the same as the flow characteristic of the power stream issued by said means for issuing and further the pressure of the power stream received varies as a function of the flow parameter of the stream of fluid to be measured over said predetermined range; and feedback means responsive to the fluid received by said receiver for applying pressurized fluid to said means for issuing at a pressure which is a predetermined function of the pressure at said receiver.

38. A fluidic sensor for monitoring a parameter of a flowing stream of fluid, said parameter being variable over a predetermined range, said sensor comprising:

means for issuing a power stream into said stream of fluid;

a receiver disposed in said stream of fluid and positioned to receive said power stream;

said receiver located such that the flow characteristic of said power stream received by said receiver is the same as the flow characteristic of the power stream issued by said means for issuing and further the pressure of the power stream varies as a function of the flow parameter of the stream of fluid to be measured over said predetermined range;

said means for issuing and said receiver being adapted to be positioned in said stream of fluid such that the power stream flows parallel to said stream of fluid.

* * * * *